United States Patent [19]

Green et al.

[11] 4,182,215
[45] Jan. 8, 1980

[54] FAILSAFE HYDRAULIC PRESTRESSING NUT

[75] Inventors: Sidney J. Green, Salt Lake City; Randy R. Nielsen, Murray, both of Utah

[73] Assignee: Terra Tek, Inc., Salt Lake City, Utah

[21] Appl. No.: 910,444

[22] Filed: May 30, 1978

[51] Int. Cl.² .............................................. F16B 31/04
[52] U.S. Cl. ...................................... 85/32 T; 92/17; 92/62; 92/107
[58] Field of Search ................ 85/32 T, 1 T, 32 R, 85/61, 62; 403/15, 31; 92/107, 17, 62, 21 R, 23, 24, 128; 29/446; 73/761, 837; 277/DIG. 6

[56] References Cited

U.S. PATENT DOCUMENTS

| | | | |
|---|---|---|---|
| 2,497,438 | 2/1950 | Butler | 92/107 X |
| 2,644,804 | 7/1953 | Rubin | 277/DIG. 6 X |
| 2,964,424 | 12/1960 | Mast | 277/DIG. 6 X |
| 3,033,597 | 5/1962 | Miller | 85/32 R X |
| 3,097,003 | 7/1963 | Deve et al. | 403/15 X |
| 3,154,006 | 10/1964 | Novak | 85/32 R X |
| 3,424,080 | 1/1969 | Pappas | 85/32 R X |
| 3,462,180 | 8/1969 | Bunyan | 85/32 R X |
| 3,463,044 | 8/1969 | Rossman et al. | 85/32 R X |
| 3,664,540 | 5/1972 | Witkin | 85/32 RX |
| 3,938,427 | 2/1976 | Warrington | 92/107 |

FOREIGN PATENT DOCUMENTS

| | | | |
|---|---|---|---|
| 2455788 | 8/1976 | Fed. Rep. of Germany | 85/1 T |
| 2434 | of 1887 | United Kingdom | 92/128 |
| 980090 | 1/1965 | United Kingdom | 85/32 R |
| 991783 | 5/1965 | United Kingdom | 85/62 |
| 1014479 | 12/1965 | United Kingdom | 85/1 T |
| 1204925 | 9/1970 | United Kingdom | 85/32 R |

Primary Examiner—Thomas J. Holko
Attorney, Agent, or Firm—M. Reid Russell

[57] ABSTRACT

The present invention relates to hydraulic prestressing nuts for setting a tensile stress in a bolt whereon the nut of the present invention is turned. The invention involves a nut body wherein an annular piston is arranged to be hydraulically extended from a bottom face thereof against a plate, head, platen, or the like, elevating the nut and extending the bolt therewith. A concentric loading ring is arranged with the nut body for turning into engagement with the place, such that when the loading ring is so extended, it provides a rigid columnar support to the annular piston. Tensile stress on the bolt is maintained by the loading ring. The nut of the present invention further involves a failsafe arrangement for providing a backup repressurization capability consisting of a second piston arrangement that can be independently pressurized at a primary seal failure, extending the primary piston therewith. The present invention also provides manually and hydraulically operated arrangements for breaking apart the loading ring should reextension of the piston arrangement become impossible for any reason.

13 Claims, 4 Drawing Figures

FAILSAFE HYDRAULIC PRESTRESSING NUT

BRIEF DESCRIPTION OF THE INVENTION

1. Field of the Invention

This invention relates to hydraulic prestressing nuts for use in prestressing of rods, bolts or the like, and additionally provides failsafe arrangements therewith for insuring the removal of the nut.

2. Prior Art

In today's world of high pressure pumps, motors, gas transfer arrangements, and the like, for containing high pressures, there is an increasing utilization of expanding nuts for applying tensile loading forces to rods, bolts, or the like. Such nuts generally involve hydraulically movable parts that act against a head, platen, or the like, to elevate a bolt or rod therewith for providing the necessary force to squeeze together to a tight seal, objects sandwiched together below the nut. For many years such stressing or loading has been accomplished mechanically by use of a torque wrench, thermal heating, or some like arrangement or process. In recent times, however, certain hydraulically operated nuts have been developed that involve hydraulically actuated movements to provide such desired prestressing. Such nuts have generally involved annular circular pistons arranged to be hydraulically extended to engage against a plate, head or the like, urging the nut body upward, providing a tensile stress, as desired, to a rod, bolt, or the like. A number of United States Patents that have been issued concerning such devices to include U.S. Pat. Nos. 2,571,265; 3,154,406; 3,424,080; 3,462,180; and 3,938,427. Prestressing nuts are also shown in certain patents issued in Great Britian, Numbers 980,090; 1,014,479; and 1,204,925, and a prestressing nut of interest is also shown in German Pat. No. 2,052,788. These patented devices all share characteristics common to the present invention, including a nut body, wherefrom a piston arrangement is hydraulically extended for producing a tensile stress in a bolt, rod, or the like, over which that nut is turned. Further, several of these devices, like the present invention, also involve a loading or jam ring arrangement that can be turned manually, mechanically or hydraulically into engagement with a head or platen that the rod or bolt extends through, providing thereby a columnar support whereafter the piston can be retracted into the nut.

A prestressing nut that is similar to the above cited prior art devices is also shown in a prior patent application Ser. No. 716,821, now abandoned, which application one of the coinventors hereto was also a coinventor of.

None of the cited prior art devices, however, and no device within the knowledge of the inventors, has heretofore provided, as does the present invention, in the event of a failure of the primary hydraulic extending means thereof, for a secondary arrangement for hydraulically extending a piston portion thereof. Additionally, as a further failsafe and unlike any device within the knowledge of the inventor, the present invention provides an arrangement for breaking away the jam ring portion thereof, releasing the columnar support, relieving the tensile stress force off from the rod or bolt. The present invention recognized the face that, should a nut be left in place over a long period of time, seal deterioration could take place or the seals could themselves be faulty or could blow out during a subsequent pressurization operation. Therefore, the present invention incorporates failsafe features, operated independently from the primary piston and seals, includes a secondary piston and seal that, when operated, extends appropriately to force the primary piston therewith to relieve tension from the nut, allowing the loading ring to be backed off. Further, recognizing that even the secondary piston and seals therewith could experience a failure, the present invention involves also, alternative arrangements for breaking away mechanically and/or hydraulically the loading ring portion thereof to provide an emergency relief of tensile stresses on the rod or bolt.

The present invention is believed by the inventors to be unlike any prior prestressing nut, jacking nut, jam nut, or the like, in that it incorporates certain failsafe or backup arrangements therewith that are not taught in any device within the knowledge of the inventors. The present invention is therefore believed to be both novel and unique and a significant improvement in the art.

SUMMARY OF THE INVENTION

It is a principal object of the present invention in a failsafe hydraulic prestressing nut to provide a nut for exerting a tensile stress into a rod or bolt, which nut incorporates failsafe features therewith for providing for its removal, to relieve the tensile stresses from that rod or bolt, even should reapplication of hydraulic pressure to a primary piston portion of the nut become impossible.

Another object of the present invention is to provide a prestressing nut that included alternative hydraulic arrangements for extending a piston portion therefrom.

Another object of the present invention is to provide, in a prestressing nut, alternative arrangements for breaking away a loading ring portion of the nut that is turned appropriately to provide a columnar support between the nut body and a plate against which plate the nut is turned, that breaking away of the loading ring for immediate release of tensile stress conditions on a rod or bolt onto which the nut is turned.

Still another object of the present invention is to provide a prestressing nut that is economical to construct, that is normally operated by injection of hydraulic fluid therein and additionally involves failsafe arrangements for insuring that the tensile stresses exerted by the nut on the rod or bolt can be relieved and the nut can be removed even should a seal failure occur thereto sufficient to prohibit a repressurization thereof and extension of the primary piston portion allowing the loading ring to be retracted.

Still another object is to provide a prestressing nut that can be connected in a series with like nuts for simultaneous application of like tensile stresses to a number of rods or bolts.

The principal features of the present invention in a failsafe hydraulic prestressing nut include a nut body that is internally threaded appropriately such that it can be turned on to an appropriately threaded rod, bolt, or the like, which rod passes through a head, platen or like structure, with operation of the present invention intended to provide a stretching of the rod or bolt exerting a compressive force against the head or platen. The nut body exterior is threaded appropriately to receive a loading or jam ring turned thereon, the loading ring to be turned appropriately to bring the lower surface thereof into engagement with the head or platen, providing a rigid columnar support between the nut body and that head or platen after a hydraulically actuated piston portion is appropriately extended from the nut body. Whereafter, lifting pressure generated by that piston extension can be discontinued, the piston relaxed appropriately into nut body, the applied tensile stresses on that bolt maintained through the loading ring. To provide the required lifting, the present invention preferably involves annular primary piston arrangement that is set into an annular opening in the nut body under surface. So arranged, when the lower face of the annular primary piston is extended from the nut body by passage of hydraulic fluid under pressure into the annular opening above that primary piston its face engages the head or platen surface moving the nut body away providing a tensile stressing of the rod or bolt. The present invention involves also a secondary annular piston arranged to receive, independent from the primary, fluid under pressure from an external source, that secondary piston extending thereby appropriately against the top surface of the primary piston extending it, as described above, against the head or platen. In normal operation the primary piston will provide sufficient lifting force to, as desired, elevate the nut body appropriately to stretch or prestress the rod or bolt.

When, however, after a time period with the nut body of the present invention installed as described, to such rod or bolt, the seals of the primary piston may fail, making a repressurization thereof impossible. The secondary piston is pressurized through a separate fluid passage arrangement to lift the nut body and loading ring appropriately allowing that loading ring to be turned on the nut body back to its nonsupportive attitude. The secondary piston thereby provides for a lifting of the nut body as a failsafe arrangement.

While it would be unlikely that both the primary and secondary piston seals would fail so as to prohibit repressurization and extension thereof, should that eventuality occur, the present invention provides also for alternative arrangements for breaking away the loading ring off from the nut body so as to relieve the tensile stress condition off from the rod or bolt. A first loading ring embodiment consists of notching the ring appropriately such that, by striking the notch with an appropriate chisel, or the like, the loading ring will break at that notch. A second loading ring embodiment, involving a pressureport in the loading ring body that is arranged to receive fluid under high pressure to break, at that port, the loading ring, breaking of the loading ring, of course, to relieve tensile stress forces in the rod or bolt.

Further objects and features of the present invention in a failsafe hydraulic prestressing nut will become apparent from the following detailed description taken together with the accompanying drawings.

THE DRAWINGS

FIG. 1, is a top plan view of a failsafe hydraulic prestressing nut of the present invention showing a first embodiment of a loading ring portion thereof that involves notching that ring as a safety breakaway arrangement.

FIG. 2, a profile sectional view taken along the line 2—2 of FIG. 1, showing a body of the nut as containing a preferred arrangement of a single annular cavity wherein primary and secondary annular pistons with seals therewith are aligned over one another, the secondary above the primary, with appropriate independent fluid passage ports for selectively passing fluid under pressure to above either the primary or secondary pistons.

FIG. 3, a top plan broken away portion of a portion of a failsafe hydraulic prestressing nut body of the present invention that includes a portion of a second embodiment of a loading ring that includes a high pressure breakout portion for admission of fluid under high pressure for fracturing that loading ring; and FIG. 4, a sectional view taken along the line 4—4 of FIG. 3, exposing the interior of the high pressure breakout port of the loading ring of FIG. 3.

DETAILED DESCRIPTION

Figure 1:
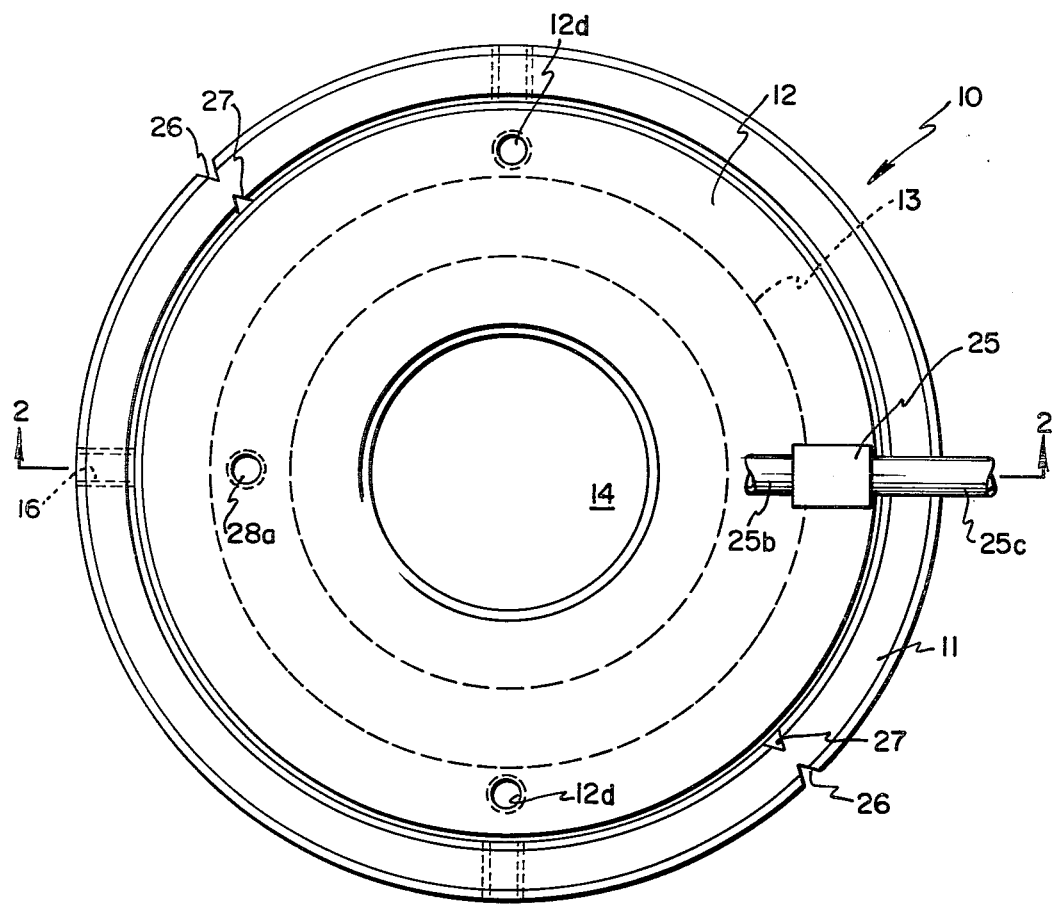
Figure 3:
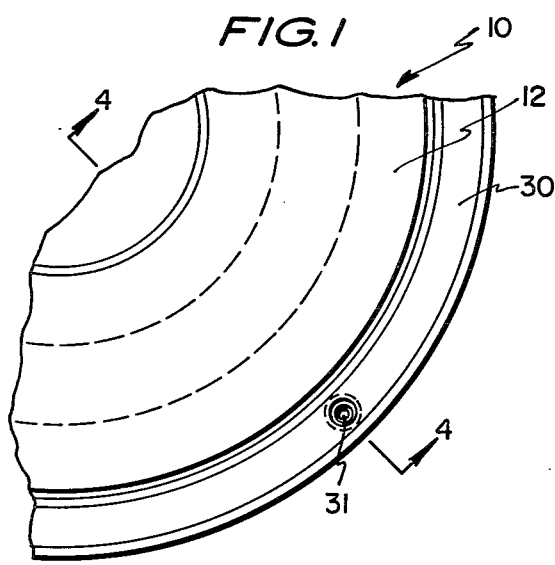

Referring now to the drawings:

In FIG. 1 is shown a preferred embodiment of a failsafe hydraulic prestressing nut 10 of the present invention, hereinafter referred to as a nut. Included therewith is a first preferred embodiment of a loading ring 11 including breakout notches 26 and 27 formed therein. Similarly, in FIG. 3 is shown a broken away portion of nut 10, including therewith a second preferred embodiment of a loading ring 30 shown therein as incorporating a high pressure breakout port 31. The function of which breakout notches 26 and 27 and high pressure breakout port 31 will be described in detail later herein.

Nut 10, as shown in FIG. 1 and in a profile section view of FIG. 2, in addition to the loading ring 11, hereinafter referred to as ring, preferably consists of a body 12 having a center longitudinal bore 13 formed therethrough. The longitudinal bore 13 is threaded appropriately to receive a threaded bolt 14 turned therethrough, as shown best in FIG. 2. Bolt 14 could obviously be a threaded rod, or any like fastening device, requiring prestressing that is appropriate for use with the nut 10. Shown best in FIG. 2, ring 11 is internally threaded at 11(a), preferably with threads commonly known as buttress threads having a flat supporting side 11(c) on each thread that is approximately parallel to the top and bottom faces 12(a) and 12(b), respectively, of body 12. Likewise, the outer circumference of body 12 preferably has complimentary buttress threads formed therearound, such that ring 11 can be turned thereover.

Shown in FIG. 2, bolt 14 is preferably fitted through two plates, 15 and 16, which could be taken as being plates, heads, platens, or the like, hereinafter referred to as plates, that need to be squeezed tightly together. So arranged, nut 10 is turned down over bolt 14 such that the bottom 12(b) thereof engages a top 15(a) of plate 15, an undersurface 14(a) of the head of bolt 14 being drawn tightly against the underface 16(a) of plate 16. Thereafter, as will be described in detail later herein, with respect to FIG. 2, the nut 10 is hydraulically operated so as to extend a circular primary annulus piston 18 hereinafter referred to as primary piston, such that its end face 18(c) engages the top 15(a) of plate 15, elevating the nut body 12 therefrom, applying a tensile stress to bolt 14. Thereafter, ring 11 can be turned, either manually or with an appropriate clamping tool, not shown, such that the lower surface 11(b) thereof contacts the top 15(a) of plate 15 forming a columnar support therewith. Whereafter, hydraulic pressure can be removed from the primary piston of nut 10, that primary piston relaxing into nut body 12, ring 11 contact to plate top 15(a) thereafter maintaining the desired tensile stress in bolt 14.

Nut 10 to provide the described primary piston 18 extension described above, shown best in FIG. 2, has a circular annulus 17 formed therein as a groove in the bottom 12(b) extending from approximately the midpoint thereof upwardly to approximately the center of the body 12, the walls of which annulus at 17(a) and 17(b) preferably flare outwardly proximate to the body bottom 12(b). Within annulus 17 is shown a primary piston 18 having primary seals 19 arranged therearound in grooves 19(a) and 19(b) proximate to the top 18(a) of primary piston 18, hereinafter referred to as secondary piston. A circular secondary annulus piston 20 is stacked thereon, having secondary seals 21 arranged therearound in grooves 20(a) and 20(b). The primary and secondary pistons 18 and 20 are independent from one another, the top of 18(a) of primary piston 18 resting against the bottom 20(a) of secondary piston 20. Tapped screw holes 18(b) and 20(b), respectively, are preferably formed in primary and secondary piston ends 18(c) and 20(a) for facilitating pulling each piston from annulus 17 should a seal failure occur, or the like.

In operation, to extend primary piston 18 out from annulus 17, the end face 18(c) thereof contacting the top 15(a) of plate 15, as described, fluid under pressure is injected through a port 22 that is formed in body 12 and extends into the side of annulus 17. Said fluid travels into a cavity 23 formed between the annulus 17 wall and the secondary piston 20 proximate to the end 20(a) thereof. Fluid passing into cavity 23 between the secondary piston 20 and annulus 17 wall acts on the top 18(a) of the primary piston forcing primary and secondary pistons apart, the pressure forcing the primary piston 18 out of annulus 17 such that the bottom end 18(c) thereof engages the top 15(a) of plate 15, elevating nut 10, as described to apply the desired tensile stress to bolt 14. Pressure above primary piston 18 acts, of course, not only on the top 18(a) thereof, it also acts on the primary seal 19 which seals prohibit the passage of fluid therearound. After ring 11 is turned appropriately to provide columnar support, pressure can be removed off from the top 18(a) of the primary piston 18 allowing it to retract into annulus 17.

Figure 2:
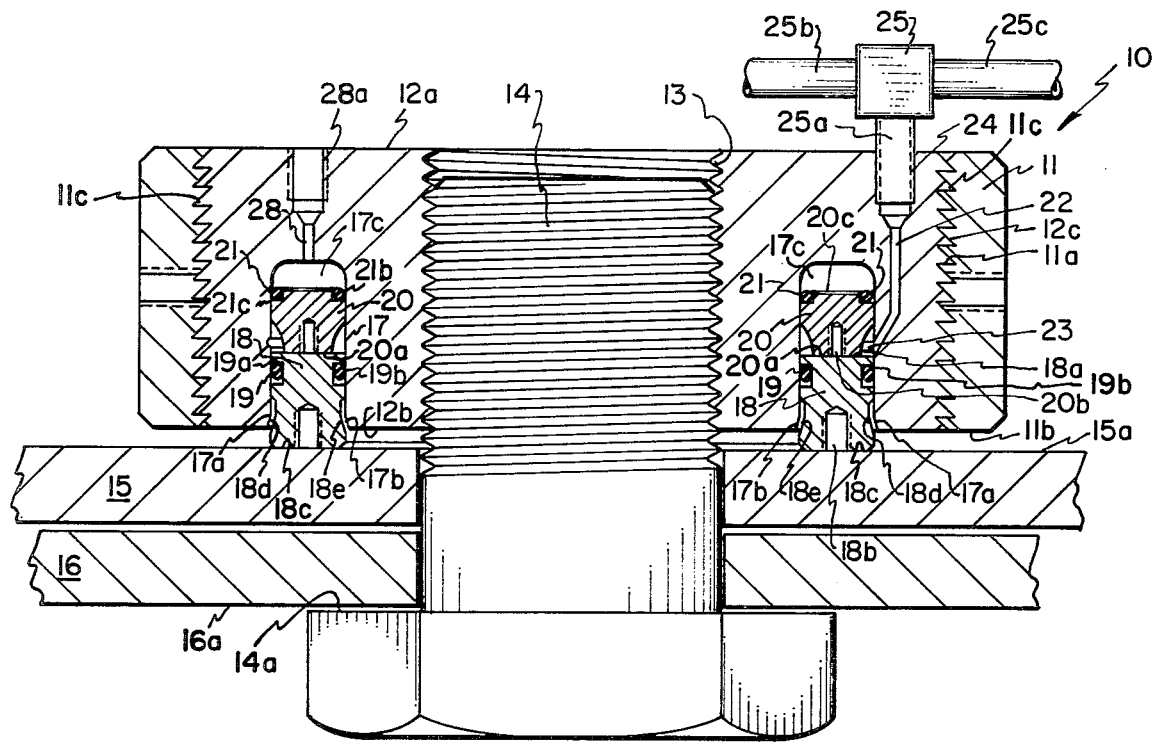

With the ring 11 turned appropriately providing columnar support between the plate top 15(a) and nut body 12, should it be desired to repressurized primary piston 18 so as to extend it to take tension off of ring 11, allowing that ring to be turned back to the attitude shown in FIG. 2, then fluid under pressure could again be passed through port 22 appropriately to extend said primary piston 18. However, if in the interim one or both of seals 19 has broken down, when resubjected to pressurization a failure in that system could occur such that that seal would extrude around piston 18 and out from annulus 17, or passes fluid therearound, thereby prohibiting a reextention of piston 18, to relieve the columnar support of ring 11 on plate top 15(a) as described above. Should this seal failure occur, the present invention provides as a backup system, for the passage of fluid under pressure through a secondary port 28 shown also in FIG. 2, which fluid under pressure acts within a dome top 17(c) of annulus 17 against a top surface 20(c) of secondary piston 20. Secondary piston 20, of course, has seals 21 arranged therearound in grooves 21(a) and 21(b) to confine the fluid under pressure with annulus top 17(c). Therefore, by so providing fluid under pressure within the annulus dome top 17(c), above secondary piston 20, that piston will be forced against the primary piston top 18(a), forcing the primary piston outwardly as hereinbefore described, its end face 18(c) engaging the top 15(a) of plate 15. The nut 10 is thereby lifted, lifting also the ring 11 therewith to allow that ring to be turned back to the attitude shown in FIG. 2. Whereafter, the pressure can be released off from the top 20(c) of secondary piston 20 with that piston relaxing back into the attitude shown in FIG. 2. Tensile stresses are thereby removed off from bolt 14 and nut 10 can thereafter be turned off from bolt 14.

Shown in FIGS. 1 and 2, a fitting 25, having a threaded neck portion 25(a), is secured, as by turning it into a threaded neck 24 of port 22. Fluid under pressure is passed through fitting 25 into cavity 23, as described hereinabove. While not shown, it should be understood that a like fitting can be secured to threaded open neck portion 28(a) of port 28 for passing fluid therethrough into the dome top 17(c) of annulus 17 for pressurizing the secondary piston 20, as described hereinabove. As shown in FIGS. 1 and 2, fitting 25 preferably has two hoses 25(b) and 25(c) arranged therewith. When nut 10 of the present invention is used singly, it should be understood, one of lines 25(b) or 25(c) could be closed off appropriately. When, however, it is desired to arrange nut 10 series with like nuts, not shown, fluid under pressure can be transferred into and out of fitting 25 simultaneous through lines 25(b) and 25(c) respectively. Nut 10 can therefore be used alone or used serially for simultaneous pressuring of a number of bolts 14 to apply equal tensile stressing thereto.

As mentioned earlier herein, annulus 17 is preferably flared outwardly at 17(a) and 17(b) proximate to 12 bottom face 12(b) with said outward flaring matched by slanting outwardly primary piston 18 at 18(d) and 18(e). So arranged a stop is provided whereat the surfaces, respectively, of the annulus 17 and the piston 18 will contact and bind against one another prohibiting piston 18 from being sucked into annulus 17.

The described primary and secondary pistons 18 and 20 are preferably formed from a material that will resist compression when subjected to high pressure, preferably a metal such as brass, which metal has been found in practice to be satisfactory for this purpose. Primary and secondary seals 19 and 21, as stated hereinabove, are preferably maintained in appropriate grooves 19(a) and 19(b) in primary piston 18 and grooves 21(a) and 21(b), in secondary piston 20, that are preferably arranged at or near the top surfaces of each of these pistons. So arranged, when pressurized appropriately, said seals tend to flow into a crack between the piston side and the annulus wall 17. Seals formed from a graphic impregnated urethane have been found in practice to provide satisfactory sealing and will retain their pliability over time.

In FIG. 1, holes 12(d) are shown formed in the top surface 12(a) of body 12 that are arranged to receive pins of an appropriate tool, not shown, fitted therein, which tool would be arranged to span across the nut body 12 for manually turning the nut 10 appropriately on bolt 14 such that the bottom 12(b) thereof will engage the top 15(a) of plate 15.

To further provide a failsafe nut 10 the present invention also includes, should the primary piston 18 and secondary piston 20 seals 19 and 21 fail, or the like, pressure passed through either port 22 or 28 would not therefore extend the primary piston or the secondary piston against the primary piston as described. Therefore, to release tensile stresses off from bolt 14, it would be necessary to remove ring 11 from nut body 12. The turning of ring 11 on body 12 would be impossible and therefore, to provide for the removal of ring 11, the present invention involves the inclusion of exterior and interior breakout notches 26 and 27 aligned across from one another to receive a chisel, or the like tool, not shown, that is struck appropriately to break the ring 11 thereat. These notches, as shown in FIG. 1, are also aligned with a like pair of notches across ring 11, and are arranged such that, when the ring 11 is in a load bearing attitude, the stresses felt therein are vertical stresses and therefore have no weakening effect on the metal between notches 26 and 27. However, at the introduction of a horizontal stress into notch 26, towards notch 27, as described above, the metal therebetween will fracture allowing the ring to be spread apart, breaking also across the other notches 26 and 27, on the opposite side thereto, releasing nut body 12. Obviously there could be some damage occuring to the threads of nut body 12 when ring 11 is so broken away. Therefore, this procedure should be used only if a primary and secondary seal failure occurs thereby prohibiting extension of the primary piston or the stacked primary and secondary pistons, as described.

Figure 4:
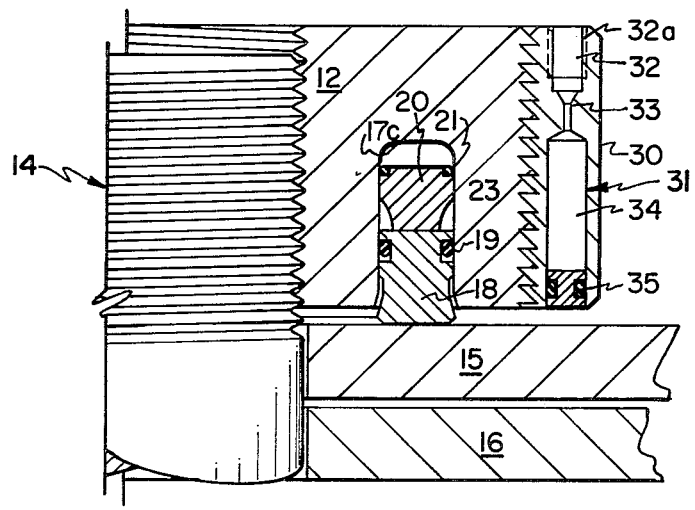

In FIG. 3 is shown a portion of a nut 10 having a nut body 12 that is the same as that already described herein, and should be understood to also contain the described and primary and secondary pistons 18 and 20, appropriate seals 19 and 21 therewith, and ports 22 and 28 for passing fluid under pressure into annulus 17, as described. FIG. 3 shows a second embodiment of a loading ring 30, hereinafter referred to as ring 30, that involves therewith a high pressure breakout port 31, hereinafter referred to as breakout port. Shown best in the sectional view of FIG. 4, breakout port 31 preferably extends longitudinally in the body of ring 30, and consists of an inlet 32, that is preferably internally threaded at 32(a) to receive an appropriate fitting, not shown, for passing fluid under high pressure therein. Breakout port 31 connects inlet 32 to a narrow neck 33 that, in turn, connects to an expansion chamber 34, which chamber is closed off and sealed appropriately by a plug 35. So arranged, when fluid under high pressure is passed into breakout port 31, that fluid travels through narrow neck 32 and into expansion chamber 34, the force of that fluid in the expansion chamber exerting horizontal stresses against the walls thereof. These horizontal stresses tend to fracture the metal of the ring 30 across the expansion chamber 34, breaking apart the ring, to allow nut 10 to fall back against the top 15(a) of plate 15.

While preferred configurations of primary and secondary pistons 18 and 20 have been shown herein, it should be obvious that the present invention is not limited to any particular shape of either the primary or secondary piston. Rather, the present invention embodies the concept of having a primary piston operated by a primary hydraulic pressure source with a secondary piston that is operated independently as backup thereto for use in the event of the failure of the first piston or the inability of the first piston to be extended from nut body 12. Obviously, such secondary piston could conceivably be arranged along side the primary piston or could involve, rather than a ring piston, one or more cylindrical pistons, or the like, for use as needed only.

Further, while the preferred embodiments of the loading rings 11 and 30 have been shown therein, it should be obvious that other configurations of loading rings having other arrangements for breaking apart those loading rings to relieve pressure off from nut 10 could be employed, which other arrangements would still come within the scope of the present disclosure.

Although a preferred embodiment of a failsafe hydraulic prestressing nut and embodiments of loading rings therefore have been shown herein, it should be understood that the present disclosure is made by way of example, and that variations are possible without departing from the subject matter coming within the scope of the following claims, which subject matter we regard as our invention.

We claim:

1. A failsafe hydraulic prestressing nut comprising,
 a body portion that is circular in shape and has a center longitudinal hole formed therethrough that is internally threaded to be turned over a threaded item to receive tensile stressing, which body portion is also externally threaded;
 a loading ring that is internally threaded appropriately for turning over external threads of said body portion;
 means associated with said loading ring for breaking away said loading ring off from said body portion;
 annulus means formed within said body portion open at a bottom face thereof, said annulus means extending into said body portion at a normal angle;
 a primary annulas piston arranged to travel within said annulus means, having appropriate seal means therewith for prohibiting fluid passage between said primary annulus piston and said annulus means wall;
 primary fluid transfer port means arranged in said body portion to pass fluid under pressure into said annulus means above said primary annulus piston;
 a secondary annulus piston arranged to travel within said annulus means having appropriate seal means arranged therewith for prohibiting fluid passage between said secondary annulus piston and said annulus means wall;
 secondary fluid transfer port means arranged in said body portion to pass fluid under pressure into said annulusmeans above said secondary annulus piston;
 means for selectively introducing fluid under pressure through said primary and secondary fluid transfer port means; and
 a source of fluid under pressure.

2. A failsafe hydraulic prestressing nut as recited in claim 1, wherein,
 the annulus means consists of a single annulus wherein are arranged the primary and secondary annulus pistons, said secondary annulus piston arranged above so as to contact when extended said primary annulus piston.

3. A failsafe hydraulic prestressing nut as recited in claim 2, wherein,
 the secondary annulus piston includes therein a notched out area that is immediately above the top of the primary piston and opposite to the point of entry of the primary fluid transfer port means into the annulus means.

4. A failsafe hydraulic prestressing nut as recited in claim 1, wherein,
 the body portion exterior threads and the internal threads on the loading ring are buttress threads.

5. A failsafe hydraulic prestressing nut as recited in claim 1, wherein,
 the primary and secondary annulus pistons are both circular and the annulus means consists of a single circular groove formed in the body portion that extends inwardly from the bottom face thereof, parallel to the center longitudinal opening, terminating within said body portion in a dome configuration.

6. A failsafe hydraulic prestressing nut as recited in claim 1, wherein,
the seal means arranged with both primary and secondary annulus pistons are formed from an impregnated urethane material.

7. A failsafe hydraulic prestressing nut as recited in claim 1, wherein,
primary and secondary annulus pistons are each formed from brass, each piston bottom face having a tapped hole formed therein.

8. A failsafe hydraulic prestressing nut as recited in claim 1, wherein
the primary fluid transfer port means enters the annulus means side above the primary annulus piston; and
the secondary fluid transfer port means enters the annulus means at the top thereof and opposite to the top of said secondary annulus piston.

9. A failsafe hydraulic prestressing nut as recited in claim 1, (further including) wherein the means for breaking away said loading ring consist of,
a pair of breakaway notches formed in the loading ring that are arranged in said loading ring across from one another, weakening thereby the material of that loading ring between said breakaway notches.

10. A failsafe hydraulic prestressing nut as recited in claim 9, wherein,
pairs of breakaway notches are formed in the loading ring, each pair located across said loading ring from the other.

11. A failsafe hydraulic prestressing nut as recited in claim 1, (further including) wherein the means for breaking away said loading ring consists of,
a high pressure port means arranged in said loading ring, for breaking said loading ring thereat when fluid under high pressure is introduced therein.

12. A failsafe hydraulic prestressing nut as recited in claim 11, wherein,
the high pressure breakout port means consists of,
a longitudinal chamber, sealed at one end, extending longitudinally within said loading ring, and arranged to receive fluid under high pressure through a narrow necked area thereof.

13. A failsafe hydraulic prestressing nut as recited in claim 1, further including,
valve means arranged with said primary fluid transfer port means for passing fluid under pressure therethrough to pressurize primary annulus piston, which valve means is arranged to be connected serially with like failsafe hydraulic prestressing nuts of the present invention for simultaneous pressurization thereof.

* * * * *